US009268856B2

(12) United States Patent
Chi et al.

(10) Patent No.: US 9,268,856 B2
(45) Date of Patent: Feb. 23, 2016

(54) SYSTEM AND METHOD FOR INCLUSION OF INTERACTIVE ELEMENTS ON A SEARCH RESULTS PAGE

(75) Inventors: Liang-Yu Chi, San Francisco, CA (US); Ashley Hall, Menlo Park, CA (US); Swati Raju, San Jose, CA (US)

(73) Assignee: YAHOO! INC., Sunnyvale, CA (US)

( * ) Notice: Subject to any disclaimer, the term of this patent is extended or adjusted under 35 U.S.C. 154(b) by 892 days.

(21) Appl. No.: 11/863,384

(22) Filed: Sep. 28, 2007

(65) Prior Publication Data
US 2009/0089312 A1 Apr. 2, 2009

(51) Int. Cl.
*G06F 17/30* (2006.01)

(52) U.S. Cl.
CPC .... *G06F 17/30867* (2013.01); *G06F 17/30873* (2013.01); *G06F 17/30991* (2013.01)

(58) Field of Classification Search
CPC ............ G06F 3/0482; G06F 17/30716; G06F 17/30554; G06F 17/30994; G06F 17/30873; G06F 17/30867; G06F 17/30864; G06F 17/30991
See application file for complete search history.

(56) References Cited

U.S. PATENT DOCUMENTS

| | | | |
|---|---|---|---|
| 6,085,201 A | 7/2000 | Tso | |
| 6,424,980 B1* | 7/2002 | Iizuka et al. | 715/206 |
| 7,593,928 B2* | 9/2009 | Canon et al. | 707/3 |
| 2002/0103876 A1* | 8/2002 | Chatani et al. | 709/217 |
| 2003/0084035 A1* | 5/2003 | Emerick, III | 707/3 |
| 2005/0131872 A1* | 6/2005 | Calbucci et al. | 707/3 |
| 2005/0131884 A1* | 6/2005 | Gross et al. | 707/3 |
| 2006/0004717 A1* | 1/2006 | Ramarathnam et al. | 707/3 |
| 2006/0112079 A1* | 5/2006 | Holt et al. | 707/3 |
| 2006/0179039 A1* | 8/2006 | Murarka | G06F 17/30657 |
| 2006/0190439 A1* | 8/2006 | Chowdhury et al. | 707/3 |
| 2006/0212817 A1* | 9/2006 | Paek et al. | 715/745 |
| 2007/0067712 A1* | 3/2007 | Baker et al. | 715/506 |
| 2007/0078822 A1* | 4/2007 | Cucerzan et al. | 707/3 |
| 2007/0209013 A1* | 9/2007 | Ramsey et al. | 715/769 |
| 2007/0239662 A1* | 10/2007 | Fontes et al. | 707/2 |
| 2007/0250492 A1* | 10/2007 | Angel et al. | 707/4 |
| 2008/0034329 A1* | 2/2008 | Posner et al. | 715/856 |
| 2008/0235594 A1* | 9/2008 | Bhumkar et al. | 715/738 |

(Continued)

FOREIGN PATENT DOCUMENTS

KR 1020030066064 A 9/2003

OTHER PUBLICATIONS

Office Action issued on Oct. 16, 2013 in Korean Application No. 10/2012/7010038.

(Continued)

*Primary Examiner* — Daniel Kinsaul
(74) *Attorney, Agent, or Firm* — Pillsbury Winthrop Shaw Pittman LLP

(57) ABSTRACT

The present invention is directed to system, methods and computer program products for generating a graphical module for the display of a query-specific content. The method according to one embodiment comprises receiving a query, determining a category identifier for the query and retrieving a category template corresponding to the category identifier for the query. At least one template query is performed, the template query corresponding to a request for data specified by the category template, and a template module is generated that comprises the data retrieved by the template query. The template module is combined with a search results page responsive to the query for display to a user.

22 Claims, 5 Drawing Sheets

(56) References Cited

U.S. PATENT DOCUMENTS

2008/0295006 A1* 11/2008 LuVogt et al. ............... 715/764
2009/0077056 A1*  3/2009 Ravikumar et al. ............. 707/5
2009/0089668 A1*  4/2009 Magnani et al. .............. 715/273

OTHER PUBLICATIONS

Office Action issued on Jun. 19, 2015 in EP Application No. 08835739.7.

* cited by examiner

FIG. 4

SYSTEM AND METHOD FOR INCLUSION OF INTERACTIVE ELEMENTS ON A SEARCH RESULTS PAGE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to generating query-dependent related content. More specifically, the present invention is directed towards systems and methods for receiving a search query and generating interactive content elements that provide links to data that are related to the original query.

BACKGROUND OF THE INVENTION

A primary goal of the Internet search engine is to accomplish the task of indexing a continually expanding collection of data. A multitude of techniques have been developed to crawl through content on the Internet and index each content item that the crawler encounters. The result is a tremendous searchable database what allows users to quickly find documents that are relevant to a given search query.

The current state of the art, however, merely provides search results matching or related to a given query and does not fully exploit known categorical attributes of a given search to fully optimize the manner in which a search engine presents a search results page. For example, a user may enter a search query comprising the name of a musician and may receive a search results page with links to a plurality of content items related to the musician, such as the official website of the musician, lyrics of songs by the musician, photos regarding the musician, etc. Where one or more specific content items related to the user are not included in the search results, the user typically must enter one or more subsequent search queries and review one or more sets of search results. This approach has the disadvantage of increasing the response time to providing an answer to the initial query intention of the user.

Prior art techniques attempt to remedy this situation by providing a list of related queries at the top of a search results page. For example, in response to a query for a musician, a search results page may display a list of the top related queries as one or more hyperlinks to subsequent search results pages. This solution is not ideal as the user must still navigate to one or more subsequent search results pages. Furthermore, the related links that the search results page provides do not represent the full spectrum of information for a given query.

Thus there is a need in the art for an interactive module for inclusion in a search results page that is operative to provide the user with direct content experiences as well as links to a plurality of content items related to a given search query. Additionally, there is a need for a search module that provides a comprehensive listing of available search queries or topics. Furthermore, there is a need in the art for a modernization of the standard search results page to decrease the amount of time necessary for a user to locate information that he or she desires. The systems and methods of the present invention provide solutions to this need by providing a dynamic and interactive module that is operative to provide the relevant data seamlessly and efficiently in the context of a search results page.

SUMMARY OF THE INVENTION

The present invention is directed towards systems and methods for generating a graphical module for the display of a query-specific content. The method according to one embodiment of the present invention comprises receiving a query, such as a search query submitted to a search engine. A category identifier is extracted from or otherwise determined for the received query. Extracting a category identifier may comprise locating the query in one or more category databases. A category template is retrieved that corresponds to the category identifier extracted from the query and a plurality of data elements identified by the category template are retrieved.

Retrieving a plurality of data elements identified by the category template may comprise retrieving one or more individual results in response to a template query and storing the results, wherein the number of stored individual results is below a predetermined threshold. Displaying may comprise hiding one or more remaining stored individual results and displaying individual resources in response to a user interaction. In one embodiment, the user interaction may comprise a mouse over. In an alternative embodiment, the user interaction may comprise a mouse click, although other user interaction is considered as falling within the scope of embodiments of the invention.

An interactive module comprising the retrieved data is generated according to presentation data stored within the category template and the interactive module is combined with a requested content item (such as a search results page) for display to the user. Generating an interactive module may comprise generating an HTML file.

The present invention is further directed towards a system for generating a graphical module for the display of a query-specific content. The system of the present invention comprises one or more client devices coupled to a network and a search provider coupled to the network, the search provider operative to receive one or more search queries from the client devices. A query may comprise a search query submitted to a search engine, which may be in communication with the search provider.

The search provider comprises an extraction module operative to extract or otherwise determine a category identifier for the query, wherein extracting a category identifier may comprise locating the query in one or more category databases. A template storage module is coupled to the extraction module and may be operative to retrieve a category template corresponding to the category identifier extracted from the query. A template creation module may be operative to retrieve a plurality of data elements identified by the category template. Template creation module may further be operative to generate an interactive module according to presentation data stored within the category template.

Retrieving a plurality of data elements identified by the category template may comprise retrieving one or more individual results in response to the template query and storing the individual results, wherein the number of stored individual results is below a predetermined threshold. The category template may retrieve or otherwise assemble content from a plurality of disparate sources, e.g., from several different sites and domains, into an interactive module that may be graphical, auditory, or otherwise broadly interactive.

The interactive module may be combined with a search results page that is responsive to the query. Displaying the combined item may comprise hiding a plurality of stored individual results and displaying one or more individual results in response to a user interaction. In one embodiment, the user interaction may comprise a mouse over. In an alternative embodiment, the user interaction may comprise a mouse click. Furthermore, in one embodiment, generating an interactive module comprises generating an HTML file.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 4 and 5 present screen diagrams illustrating a graphical module for the display of query-dependent content within a search results page according to various embodiments of the present invention.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
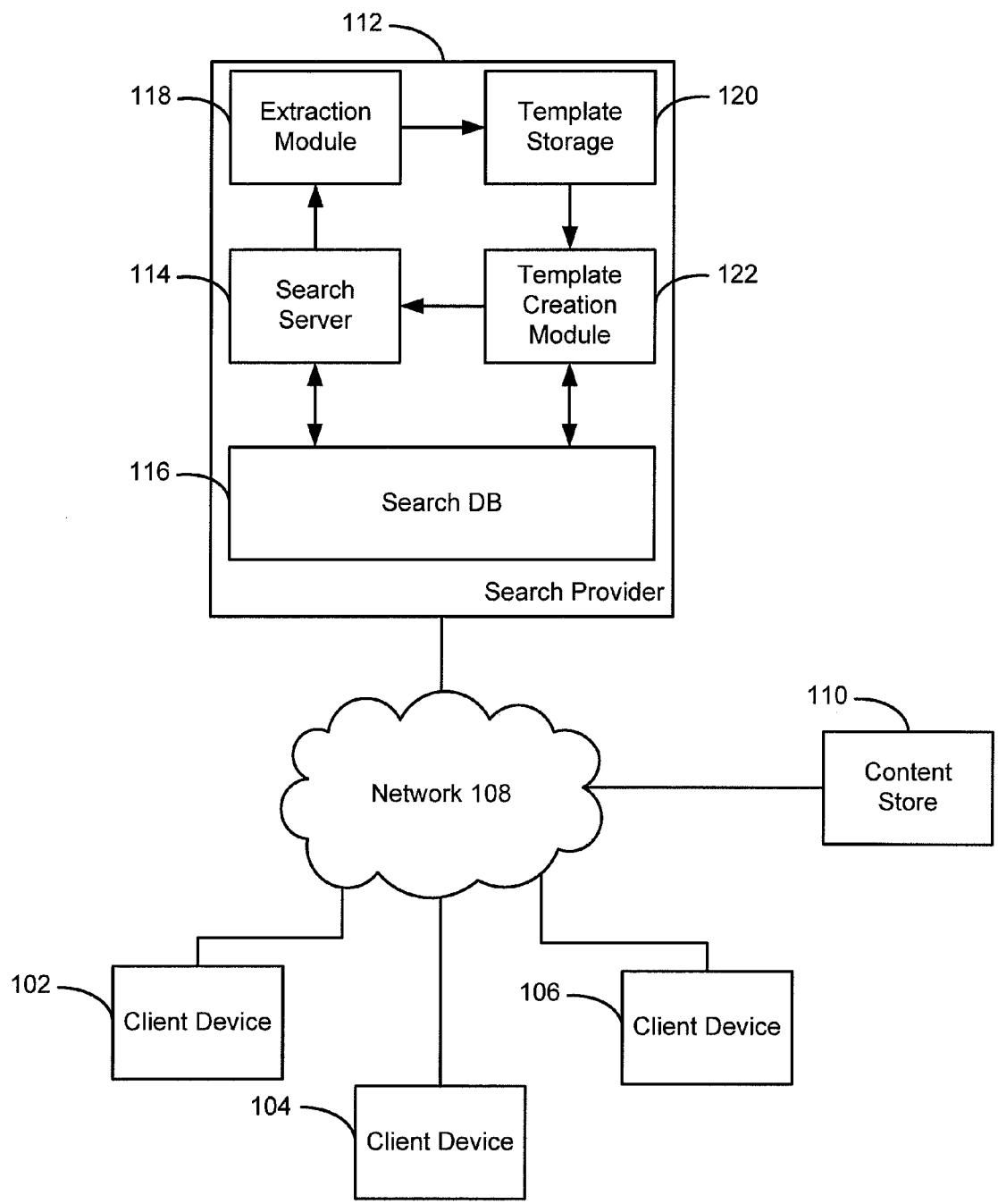
FIG. 1 presents a block diagram illustrating a system for generating a graphical module for the display of query-dependent related content according to one embodiment of the present invention.

FIG. 1 presents a block diagram depicting a system for generating a graphical module for the display of query-dependent related content according to one embodiment of the present invention. A system 100 comprises a plurality of client devices 102, 104 and 106, a content store 110 and a search provide 112 coupled to a network 108, which may include a connection to one or more local and wide area networks, such as the Internet. According to one embodiment of the invention, a given client device 102, 104 and 106 is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 102, 104 and 106 may be in communication with a search provider 112 that hosts one or more content items. The search provider 112 may maintain one or more search servers 114, a given search server 114 operative to host or generate one or more web pages. The search provider 112 may also comprise a repository for the storage and transmission of one or more content items in response to a request from a client device 102, 104 and 106. For example, the search provider 112 may comprise a web site that includes a search server 114 (e.g., Apache™, Internet Information Server™, etc.) and a search database 116, which according to one embodiment is a database that maintains an index of content items in an organized and structured manner. The search provider 112 may further maintain and execute program code that is operative to dynamically generate one or more content items, for example, a search results page.

A resultant page that the search provider 112 provides to a client 102, 104 and 106 may have links or references to one or more resources or content items for inclusion in the page and rendering by the client 102, 104 and 106. Exemplary resources that a content item may comprise include, but are not limited to, hyperlinks, JavaScript files, Cascading Style Sheets, images, video and audio.

A client device 102, 104 and 106 may be operative to transmit a search request that contains a search query to a search provider 112 and search server 114. The search server 114 handles the incoming search requests and performs a search of the search database 116, as is known by those of skill in the art. The search server 114 may submit a request to search database 116 for search results, the search database 116 returning one or more relevant search result 114. Search server 114 is operative to forward the received query to the extraction module 118.

The extraction module 118 may be operative to analyze a given user query and determine an appropriate category for classification of the query. In one embodiment, the extraction module 118 may query one or more category databases (not shown) to locate matches for a given query. For example, if a user enters the query "superbad", extraction module 118 may query one or more databases, including, but not limited to, a music database, a location database, a sports data and a movies database.

The extraction module 118 determines the type or category of query submitted and forwards the query and query type or category to template storage 120, where an appropriate template is chosen for a given query. In one embodiment, the template storage 120 stores a plurality of skeleton templates for a given category. For example, a movies template may comprise a container for a movie poster image, a for a trailer link, a movie title, one or more movie reviews, one or more show times, etc.

A given template is forwarded from template storage 120 to template creation module 122. A template forwarded to the template creation module 122 may comprise instructions on how to fill a given template. For example, a template for a movie query may comprise a plurality of instructions operative to cause the template creation module 122 to retrieve one or more show times from a database such as search database 116 and one or more reviews. Although illustrated as a single database 116, in an alternative embodiment a plurality of databases may span a plurality of devices. For example, continuing the previously described movie query example, a first database may store the returned search queries, a second database may store the movie listing data and a third database may store the ratings and reviews data.

In an alternative embodiment, a template creation module 122 may pull a plurality of data elements spanning a variety of domains. In this embodiment, module 122 may perform search queries from a variety of internal and external sources. For example, if a user query comprises and artist and song title, template creation module 122 may be operable to retrieve a plurality of data from a plurality of data sources. For example, at least one music video resource may be retrieved from a third party video server, such as YouTube or Launch. Additionally, lyrics to the song may be retrieved from a lyrics server, track information may be retrieved from a global database such as Gracenote and album artwork may be retrieved via an image server.

Template creation module 122 may further be operable to parse a first set of retrieved items and generate queries based on the retrieved items. Continuing the artist/song title example previously presented, a template creation module 122 may extract the artist and song title and query an album database, such as Gracenote. The album database may return a plurality of items including the album or albums featuring the song title. The template creation module 122 may be operative to utilize this data and retrieve at least one album cover from an image server.

In one embodiment, data retrieved by template creation module 122 may comprise interactive elements, such as video and audio. In this embodiment, an interactive module may be presented to the user comprising a plurality of interactive elements retrieved from a plurality of data sources. For example, an interactive module corresponding to a movie may comprise a trailer for the queried movie that plays in response to a user interaction such as a mouseover or mouse-click.

After construction of a given template at the template creation module 122, the completed template is returned to the search server 114. In accordance with one embodiment, a completed template may comprise a plurality of HTML and JavaScript program code. Search server 114 may receive the completed template and embed the template into the generated page of search results. The template may be presented at the top of a search result page, guaranteeing a user will see the query-specific template, although other locations of the completed template on the search results page is contemplated as falling within the scope of embodiments of the present invention.

Figure 2:
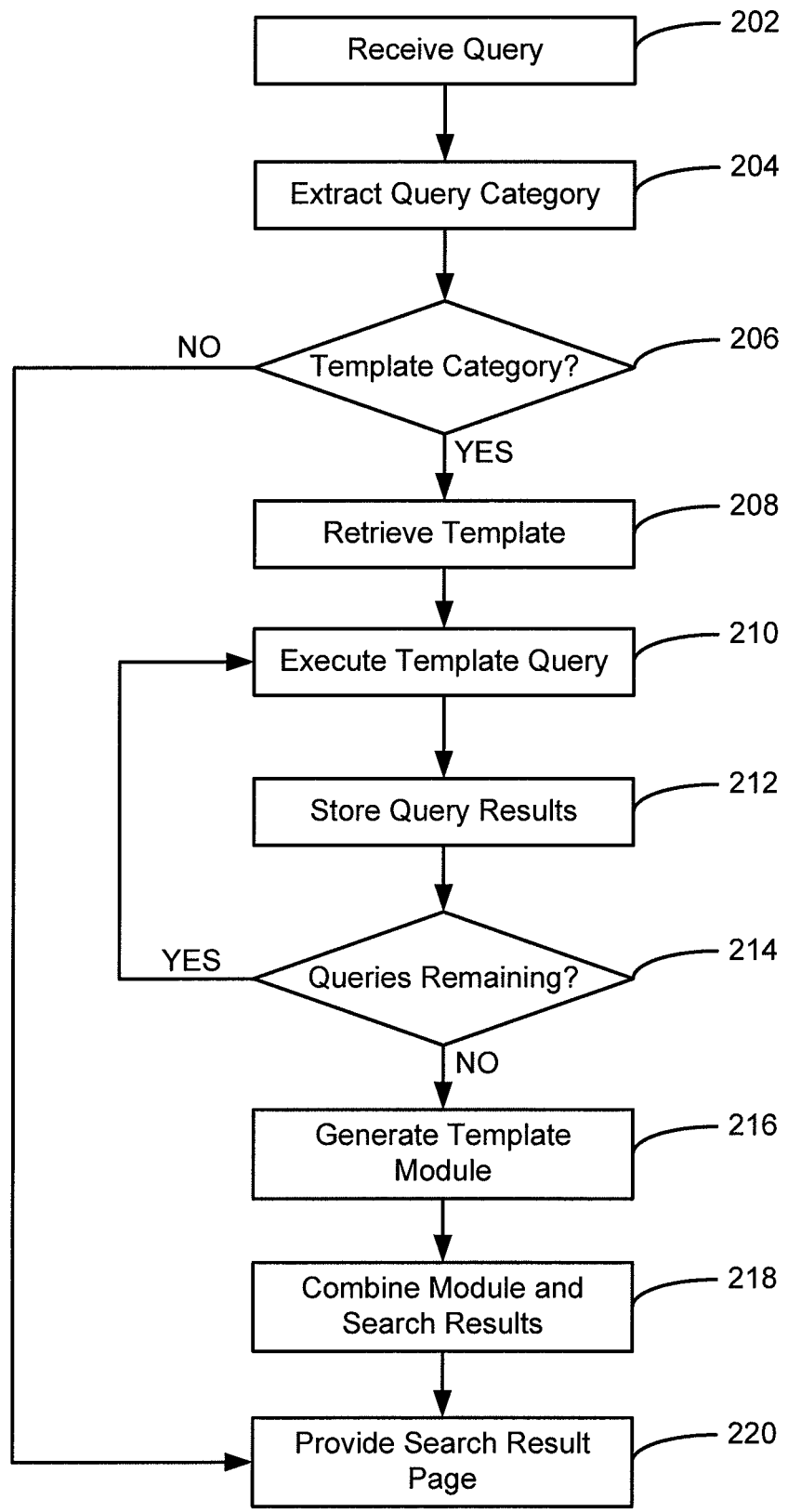
FIG. 2 presents a flow diagram illustrating a method for generating a graphical module for the display of query-dependent related content according to one embodiment of the present invention.

FIG. 2 presents a flow diagram illustrating a method for generating a graphical module for the display of query-dependent related content according to one embodiment of the present invention. As FIG. 2 illustrates, a search provider receives a query, step 202. A query may be received as an HTTP request via a GET or POST request, the query being stored within the header of the request or within a cookie. The query may comprise a URL encoded text string submitted via an HTML form.

Upon receiving the query, a category is extracted on the basis of the received query, step 204. For example, a query may be received containing the query terms "daft punk," which may be associated with the category "music". A check is performed to determine if a category is found for the given search query, step 206. If no category was found, one or more search results may be provided to the user as is known to those of skill in the art, step 220. Accordingly, some searches may not be categorized, such as overly specific queries (e.g., "int to NSString conversion") or queries that are not categorized within a plurality of predefined category databases.

If a category for a given query is found, a template corresponding to the category may be retrieved, step 208. The method 200 may comprise retrieving a template from an external database containing one or more templates. A given template may comprise a plurality of HTML or JavaScript elements forming a "skeleton" of a final template. A given template may comprise formatting elements of the template such as size, position of elements and type of elements within the template. An exemplary template is shown in Example 1.

EXAMPLE 1

```
1 <div id='movietemplate'>
2   <div id='movieimage'>#MOVIE IMAGE#</div>
3   <div id='movietitle'>#MOVIE TITLE#</div>
4   <div id='moviereviews'>#MOVIE REVIEWS#</div>
5   <div id='movieshowtimes'>#MOVIE SHOWTIMES#</div>
6 </div>
```

As Example 1 illustrates, a barebones movie template may be provided for providing results for queries that are related to movies. The present method 200 may replace a given entry enclosed with number signs with data corresponding to various aspects of the given user query.

The template is retrieved and a template query may be executed, step 210. In accordance with one embodiment, a template query may comprise a request for additional data utilizing the supplied user query as the input. For example, a movie template may comprise a plurality of queries such as a "fetch movie image", "fetch movie title", "fetch movie reviews" and "fetch show times". These calls are utilized to fetch data from one or more external data sources, such topic specific external databases, or from relevant information in the index stored in different domains. The retrieved data is stored within the template, step 212. In a preferred embodiment, storing the query results may comprise updating a skeleton template with the retrieved data in a textual format.

The previously described process (steps 210 and 212) may be repeated for a given query present within a given template, step 214. Returning to Example 1, lines 2 through 5 may represent four separate queries returning four data elements to be inserted into the skeleton template.

Following the data retrieval of steps 210, 212 and 214, the finalized template module may be generated, step 216. In one embodiment, the retrieval process may merely store data in local, non-persistent storage, wherein the final data is combined to form a final graphical search result module. In an alternative embodiment, a plurality of other parameters may be inspected for perform final modification to the template module. For example, a browser type for the browser the users is executing, operating system or browser capabilities may be inspected to modify one or more display parameters of the final template module.

The finalized template module may then be combined with the search results fetched in response to the user query, step 218, and the combined search result page and template module are provided to the user, step 220. In accordance with one embodiment, a server side program may be operative to combine the search results and the template module by inserting the template module into the existing HTML of the search results page at a predetermined position.

Figure 3:
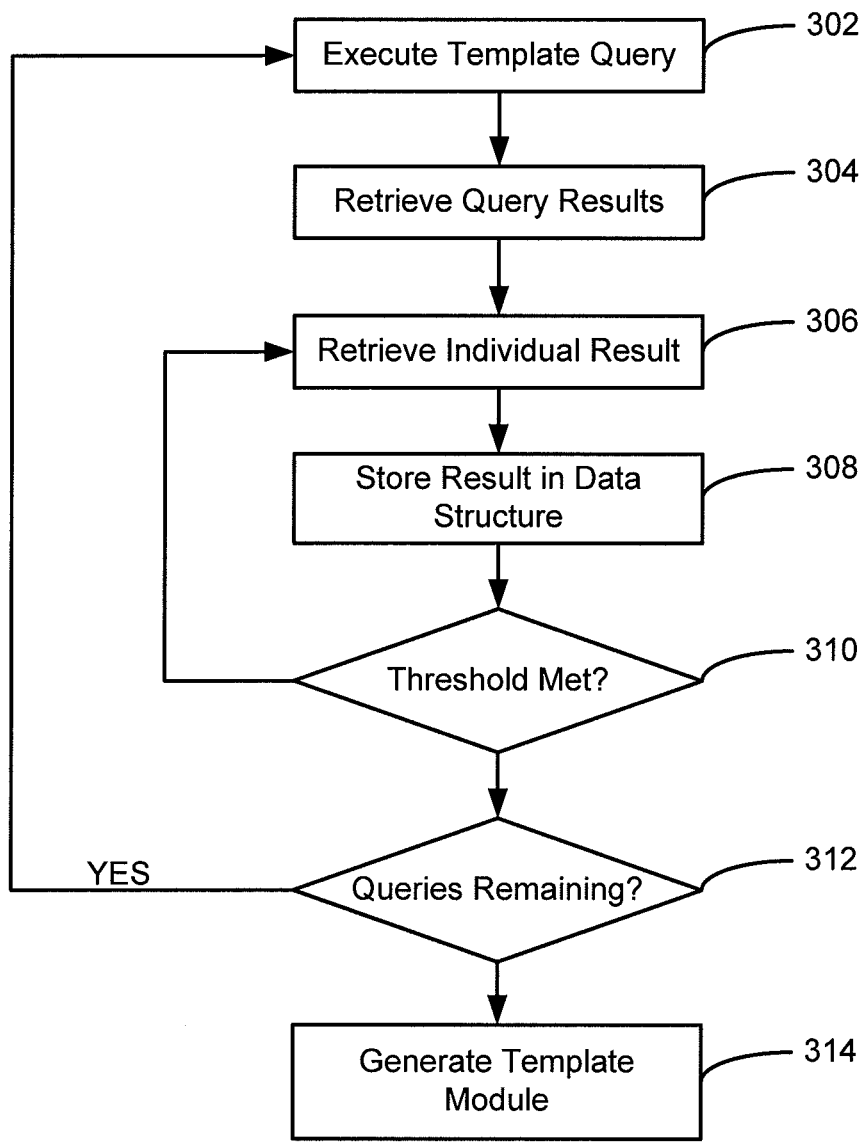
FIG. 3 presents a flow diagram illustrating a method for generating a graphical module for the display of a query-dependent related content according to another embodiment of the present invention.

FIG. 3 presents a flow diagram illustrating an alternative method for generating a graphical module for the display of a query-dependent related content according to an alternative embodiment of the present invention. As FIG. 3 illustrates, a template query is executed, step 302. A template query may comprise a request for additional data utilizing the supplied user query as the input. For example, a movie template may comprise a plurality of queries such as a "fetch movie image", "fetch movie title", "fetch movie reviews" and "fetch showtimes" query. The queries utilize the user query to fetch data from one of more external data sources, such as one or more content specific external databases.

In response to the template query, a plurality of query results may be retrieved, step 304. Query results may comprise links to one or more content items that correspond or are relevant to a given query. In one embodiment, links to one or more content items comprise links to the most relevant data located on an external server. For example, if a movie template requests a list of showtimes links to one or more content items representing showtimes may be returned. A link to a given content item may comprise XML or similarly formatted data that may be parsed and placed within the template.

An individual result may be fetched from the data set retrieved in step 304, step 306, for storage within a data structure present within the template, step 308. According to one embodiment, a data structure may comprise an array or array-like structure comprising the one or more retrieved results, with a check made to determine if the number of selected results is above or below a threshold, step 310. If the number of results is below the threshold, program flow returns to step 306 and the process may be re-executed; if not, a next query may be executed, step 312.

As described, a threshold may be utilized to limit the number of retrieved results that a template may display. For example, the present invention may be operative to utilize an existing database API to retrieve or otherwise identify links to content items for inclusion in a given template. In this embodiment, an exemplary search for showtimes may return a large number of results, depending on the location for which the user is searching. Due to limited space within the template, however, the template may utilize only a predetermined number of the returned results. In one embodiment, only a subset of the retrieved results may be stored within the template and an additional link may be provided for a user to view the remaining results. In an alternative embodiment, a first plurality of results may be displayed and in response to a user interaction (e.g., a mouseover) a larger subset of the results may be displayed in a second panel overlaying the template. The larger subset may be stored within the search results page itself, or may be fetched asynchronously in response to the user interaction.

The template queries may be executed for generation of the final template module, step 314. In one embodiment, the retrieval process of may store data in non-persistent storage, wherein the data is combined to form a final module. In an alternative embodiment, a plurality of other parameters may be inspected for performing a final modification to the template module. For example, browser type, operating system or browser capabilities may be inspected to modify display parameters of the final template module for display to the user.

Figure 4:
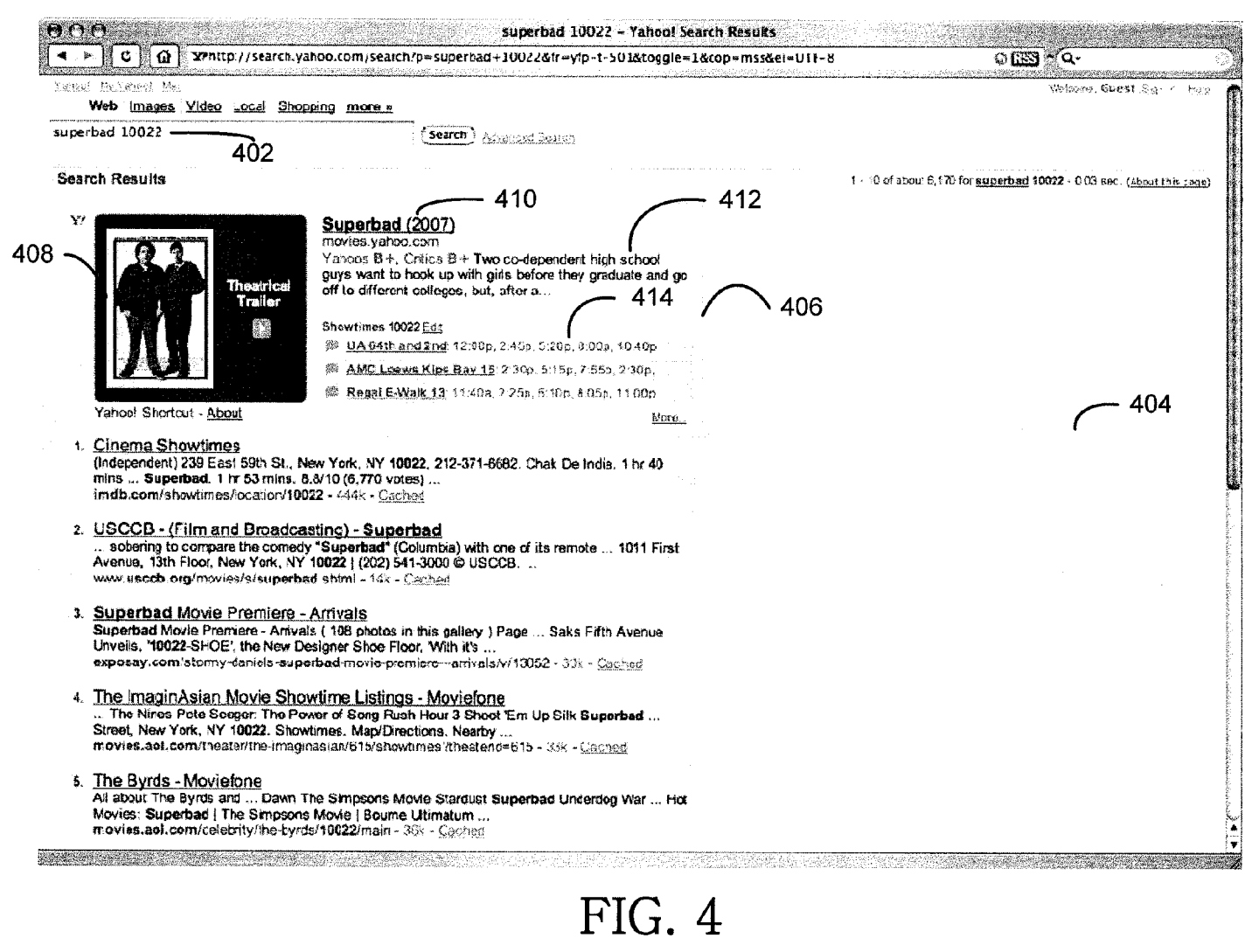

FIG. 4 presents a screen diagram illustrating a graphical module for the display of a query-specific template generated in response to a user query for a movie title. As FIG. 4 illustrates, a user enters a search query 402 via an HTML form as is known to those of skill in the art. In response to a submitted user query, a search results page containing a plurality of search results is returned to the user 404.

In addition to the search results 404, a query-specific template 406 is presented to the user. As illustrated, the template 406 is dependent on the type of query entered by the user. In the illustrated embodiment, a query-specific template 406 comprises a plurality of template fields 408, 410, 412 and 414. A query-specific movie template 406 comprises a movie image field 408, a title field 410, a reviews and ratings field 412 and a showtimes field 414.

FIG. 4 illustrates the dynamics of the present embodiment of the invention as the contents of the template are dependent on both the type of query 402 entered and additionally the content of the query 402. In addition to this dynamic aspect, in an alternative embodiment, the query may further be analyzed to determine if additional parameters are present within the user query. As illustrated, a user query 402 may comprise an additional parameter such as an area code (as illustrated, "10022") to provide greater granularity as to the data that the template 406 is operative to display. Upon receipt of the user query 402, the search provider extracts the additional parameter from the user query and further updates the template contents by modifying the showtimes field 414 to display showtimes of the queried movie closest to the submitted zip code.

Figure 5:
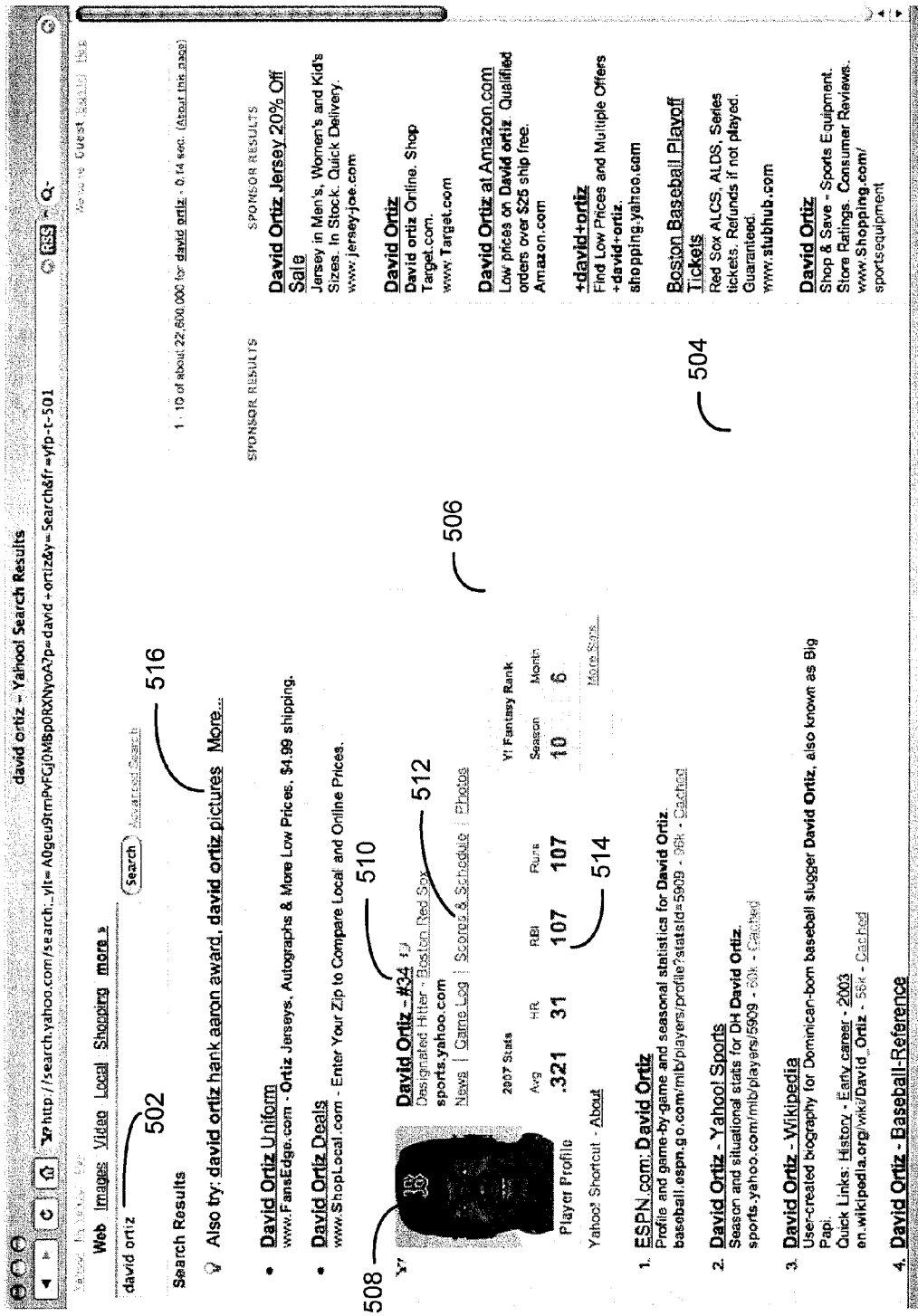

FIG. 5 presents a screen diagram illustrating a graphical module for the display of query-specific template generated in response to a user query for a professional athlete. As FIG. 5 illustrates, a user enters a search query 502 via an HTML form as is known to those of skill in the art. In response to a submitted user query, a search engine returns a search results page comprising one or more matching or otherwise relevant search results to the user 504.

In addition to the search results 504, a graphical module for the display of a query-specific template 506 is presented to the user. According to the present embodiment, the template 506 is dependent on the type or category of query that the user enters. A query-specific template 506 may comprise a plurality of template fields 508, 510, 512 and 514. A query-specific athlete template 506 comprises an athlete image field 508, an athlete field 510, a team data field 512 and a statistics field 514.

Additionally, search results page 504 contains a list of related searches 516. Related searches 516 have been identified to further distinguish the present invention from prior art techniques. As can be seen from FIG. 5, related searches 516 in accordance with the current state of the art provide one or more helpful related searches. The related searches 516, however, do not necessarily contain the information for which the user is looking. In the current embodiment, a user is more likely to be interested in the current performance of an athlete, as shown through statistics field 514, as opposed to whether he has won an award in the past, as shown through "david ortiz hank aaron award" present within related links 516. Furthermore, the information that the query-specific template 506 provides is present on the current search results page 504, thereby allowing the user to find relevant information while remaining on the search results page and obviating the need to navigate to a subsequent page as required by the list of related links 516.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for providing content, the method being implemented on a machine having at least one processor, storage, and a communication platform, the method comprising:

receiving, by an search server, a user query;
retrieving, by the search server, a first search result based on the user query;
identifying, by an extraction module, a category based on the user query;
retrieving, by a template storage module, a template based on the category;
retrieving, by a template creation module, category-specific content based on instructions in the template;
retrieving, by the template creation module, additional category-specific content based on an additional query generated based on the category-specific content;
creating, by the template creation module, a template module presenting the category-specific content and the additional category-specific content in accordance with the instructions; and
providing, by the search server, a search result page having the first search result and the template module in response to the user query.

2. The method of claim 1, further comprising:
modifying, by the template creation module, the template by replacing portions of the template with one or more terms of the user query,
wherein retrieving the category-specific content comprises retrieving the category-specific content based on instructions in the modified template.

3. The method of claim 1, wherein identifying the category comprises identifying the category based on a relatedness of the category to one or more terms of the user query.

4. The method of claim 1, further comprising:
retrieving, by the template creation module, further category-specific content based on a determination that a threshold amount of content has not been reached.

5. The method of claim 4, further comprising:
determining, by the template creation module, whether the threshold amount of content has been reached upon retrieving the category-specific content.

6. The method of claim 1, wherein at least a portion of the category-specific content or the additional category-specific content is displayed via the template module based on a user interaction with the template module.

7. The method of claim 6, wherein the user interaction includes a mouse-over over the template module.

8. The method of claim 6, wherein the user interaction includes a mouse-click within the template module.

9. A system for providing content, the system comprising:
a search server configured to receive a user query and retrieve a first search result based on the user query;
an extraction module configured to identify a category based on the user query;
a template storage module configured to retrieve a template based on the category;
a template creation module configured to:
retrieve category-specific content based on instructions in the template;
retrieve additional category-specific content based on an additional query generated based on the category-specific content; and
create a template module presenting the category-specific content and the additional category-specific content in accordance with the instructions,
wherein the search server is further configured to provide a search result page having the first search result and the template module in response to the user query.

10. The system of claim 9, wherein the template creation module is further configured to modify the template by replacing portions of the template with one or more terms of the user query, and wherein retrieving the category-specific content comprises retrieving the category-specific content based on instructions in the modified template.

11. The system of claim 9, wherein identifying the category comprises identifying the category based on a relatedness of the category to one or more rms of the user query.

12. The system of claim 9, wherein the template creation module is further configured to retrieve further category-specific content based on a determination that a threshold amount of content has not been reached.

13. The system of claim 12, wherein the template creation module is further configured to determine whether the threshold amount of content has been reached upon retrieving the category-specific content.

14. The system of claim 9, wherein at least a portion of the category-specific content or the additional category-specific content is displayed via the template module based on a user interaction with the template module.

15. The system of claim 14, wherein the user interaction includes a mouse-over over the template module.

16. The system of claim 14, wherein the user interaction includes a mouse-click within the template module.

17. Non-transitory computer readable media comprising program code for execution by a programmable processor that instructs the processor to perform a method for providing content, the computer readable media comprising:
   program code for receiving a user query;
   program code for retrieving a first search result based on the user query;
   program code for identifying a category based on the user query;
   program code for retrieving a template based on the category;
   program code for retrieving category-specific content based on instructions in the template;
   program code for retrieving additional category-specific content based on an additional query generated based on the category-specific content;
   program code for creating a template module presenting the category-specific content and the additional category-specific content in accordance with the instructions; and
   program code for providing a search result page having the first search result and the template module in response to the user query.

18. The computer readable media of claim 17, further comprising:
   program code for modifying the template by replacing portions of the template with one or more terms of the user query,
   wherein retrieving the category-specific content comprises retrieving the category-specific content based on instructions in the modified template.

19. The computer readable media of claim 17, wherein identifying the category comprises identifying the category based on the relatedness of the category to one or more terms of the user query.

20. The computer readable media of claim 17, further comprising:
   program code for retrieving further category-specific content based on a determination that a threshold amount of content has not been reached.

21. The computer readable media of claim 20, further comprising:
   program code for determining whether the threshold amount of content has been reached upon retrieving the category-specific content.

22. The computer readable media of claim 17, wherein at least a portion of the category-specific content or the additional category-specific content is displayed via the template module based on a user interaction with the template module.

* * * * *